(12) United States Patent
Gu et al.

(10) Patent No.: US 9,813,704 B2
(45) Date of Patent: Nov. 7, 2017

(54) LOSSLESS IMAGE AND VIDEO COMPRESSION

(71) Applicant: Nanyang Technological University, Singapore (SG)

(72) Inventors: Zhouye Gu, Singapore (SG); Weisi Lin, Singapore (SG); Bu Sung Lee, Singapore (SG); Chiew Tong Lau, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 841 days.

(21) Appl. No.: 14/355,260

(22) PCT Filed: Oct. 30, 2012

(86) PCT No.: PCT/SG2012/000408
§ 371 (c)(1),
(2) Date: Apr. 30, 2014

(87) PCT Pub. No.: WO2013/066267
PCT Pub. Date: May 10, 2013

(65) Prior Publication Data
US 2014/0301462 A1    Oct. 9, 2014

Related U.S. Application Data

(60) Provisional application No. 61/553,372, filed on Oct. 31, 2011.

(51) Int. Cl.
H04N 19/13 (2014.01)
H04N 19/593 (2014.01)
(Continued)

(52) U.S. Cl.
CPC ....... *H04N 19/00763* (2013.01); *H04N 19/13* (2014.11); *H04N 19/159* (2014.11);
(Continued)

(58) Field of Classification Search
CPC .... H04N 19/159; H04N 19/13; H04N 19/593; H04N 19/91; H04N 19/463
See application file for complete search history.

(56) References Cited

U.S. PATENT DOCUMENTS 7,689,051 B2    3/2010  Mukerjee
2005/0036549 A1  2/2005  He et al.
(Continued)

FOREIGN PATENT DOCUMENTS

CN    1684495 A    10/2005
CN    1839629 A    9/2006
(Continued)

OTHER PUBLICATIONS

International Search Report and Written Opinion from International Application No. PCT/SG2012/000408 dated Dec. 21, 2012.
(Continued)

*Primary Examiner* — Huy T Nguyen
(74) *Attorney, Agent, or Firm* — Merchant & Gould P.C.

(57) ABSTRACT

A method is provided for encoding an intra predicted residual block of an image for use in image or video compression. The intra predicted residual block is associated with an intra prediction coding mode. The method includes generating a set of residual error blocks including residual data with different statistical characteristics from the residual data in the intra predicted residual block. Each of the residual error blocks is scanned and entropy coded to produce a first set of bit streams. The lengths of each of the first set of bit streams are recorded. The intra predicted residual block is also scanned and entropy coded to produce a second bit stream. The length of the second bit stream is recorded. Selecting the minimum length bit stream from the first set of bit streams and the second bit stream as the output coded bit stream of the intra predicted residual block.

22 Claims, 11 Drawing Sheets

(51) Int. Cl.
H04N 19/159 (2014.01)
H04N 19/176 (2014.01)
H04N 19/91 (2014.01)
H04N 19/44 (2014.01)
H04N 19/463 (2014.01)

(52) U.S. Cl.
CPC ........... *H04N 19/176* (2014.11); *H04N 19/44* (2014.11); *H04N 19/593* (2014.11); *H04N 19/91* (2014.11); *H04N 19/463* (2014.11)

(56) References Cited

U.S. PATENT DOCUMENTS

| | | | |
|---|---|---|---|
| 2007/0237241 A1* | 10/2007 | Ha | H04N 19/176 375/240.27 |
| 2008/0219345 A1* | 9/2008 | Li | H04L 65/607 375/240.2 |
| 2009/0116550 A1 | 5/2009 | Bjøntegaard | |
| 2011/0134995 A1* | 6/2011 | An | H04N 19/176 375/240.02 |

FOREIGN PATENT DOCUMENTS

| | | |
|---|---|---|
| CN | 101836453 A | 9/2010 |
| EP | 1107608 A2 | 6/2001 |

OTHER PUBLICATIONS

Han et al., "Towards Jointly Optimal Spatial Prediction and Adaptive Transform in Video/Image Coding", *IEEE International Conference on Acoustics, Speech and Signal Processing*, pp. 726-729, 2010.

Yeo et al., "Low-Complexity Mode-Dependent KLT for Block-Based Intra Coding", *18th IEEE International Conference on Image Processing*, pp. 3685-3688, 2011.

G. J. Sullivan, "Editors' draft revision to ITU-T Rec. H.264 | ISO/IEC 14496-10 Advanced Video Coding—in preparation for ITU-T SG 16 AAP Consent," document JVT-AD205.doc, Joint Video Team of ISO/IEC 14496-10 AVC, ISO/IEC JTC1/SC29/WG11, and ITU-T Q.6/SG16, Feb. 2009, 718 pages.

A. Luthra, G. J. Sullivan, and T. Wiegand, "Introduction to the special issue on the H.264/AVC video coding standard," *IEEE Trans. Circuits Syst. Video Technol.*, vol. 13, No. 7, pp. 557-559, Jul. 2003.

T. Wiegand, G. J. Sullivan, G. Bjøntegaard, and A. Luthra, "Overview of the H.264/AVC video coding standard," *IEEE Trans. Circuits Syst. Video Technol.*, vol. 13, No. 7, pp. 560-576, Jul. 2003.

G. J. Sullivan and T. Wiegand, "Video compression: From concepts to the H.264/AVC standard," *Proc. IEEE*, vol. 93, No. 1, pp. 18-31, Jan. 2005.

Y. L. Lee, K. H. Han, and G. J. Sullivan, "Improved lossless intra-coding for H.264/MPEG-4 AVC," *IEEE Trans. Image Process.*, vol. 15, No. 9, pp. 2610-2615, Sep. 2006.

G. Sullivan, T. McMahon, T. Wiegand, D. Marpe, and A. Luthra, "Draft Text of H.264/AVC Fidelity Range Extensions Amendment to ITUT Rec. H.264," document JVT-L047.doc, Joint Video Team of ISO/IEC 14496-10 AVC, ISO/IEC JTC1/SC29/WG11, and ITU-T Q.6/SG16, Jul. 2004, 115 pages.

G. J. Sullivan, P. Topiwala, and A. Luthra, "The H.264/AVC Advanced Video Coding standard: Overview and introduction to the fidelity range extensions," in *Proc. SPIE Conf.*, Special Session Adv. New Emerg. Standard: H.264/AVC, Denver, CO, pp. 454-474, Aug. 2004.

S. Sun, "Lossless Coding and QP Range Selection," document JVTC023.doc, Joint Video Team of ISO/IEC JTC1/SC29/WG11 and ITU-T Q.6/SG16, May 6-10, 2002, 6 pages.

Y. L. Lee, K. H. Han and S. C. Lim, "Lossless Intra-Coding for Improved 4:4:4 Coding in H.264/MPEG-4 AVC," document JVT-P016.doc, Joint Video Team of ISO/IEC JTC1/SC29/WG11 and ITU-T Q.6/SG16, Jul. 2005, 12 pages.

Y. L. Lee, K. H. Han, "Complexity of the Proposed Lossless Intra," document JVT-Q035r1.doc, Joint Video Team of ISO/IEC JTC1/SC29/WG11 and ITU-T Q.6/SG16, Oct. 2005, 14 pages.

H. Yu, "Draft Text of H.264/AVC Advanced 4:4:4 Profile Amendment to ITUT Rec. H.264 |ISO/IEC 14496-10 AVC," document JVT-Q209.doc, Joint Video Team of ISO/IEC JTC1/SC29/WG11 and ITU-T Q.6/SG16, Oct. 14-21, 2005, 43 pages.

G. Bjøntegaard and K. Lillevold, "Context-Adaptive VLC (CVLC) Coding of Coefficients," document JVTC028.doc, Joint Video Team of ISO/IEC JTC1/SC29/WG11 and ITU-T Q6/SG16m, May 2002, 11 pages.

D. Marpe, H. Schwarz, T. Wiegand, "Context-based adaptive binary arithmetic coding in the H.264/AVC video compression", *IEEE Trans. Circuits Syst. Video Technol.* vol. 13, No. 7, pp. 620-636, Jul. 2003.

Y.W. Huang, et al, "Analysis, Fast Algorithm, and VLSI Architecture Design for H.264/AVC Intra Frame Coder," *IEEE Trans. Circuits Syst. Video Technol.*, vol. 15, No. 3, pp. 378-401, Mar. 2005.

"Test Model under Consideration", JCTVC-A205, Joint Collaborative Team on Video Coding meeting, Dresden, DE, Apr. 15-23, 2010, 33 pages.

H. Q. Zeng, K. K. Ma, C. H. Cai, "Hierarchical Intra Mode Decision for H.264/AVC," *IEEE Trans. Circuits Syst. Video Technol.*, vol. 20, No. 6, pp. 907-912, Jun. 2010.

M.J. Weinberger, G. Seroussi, G. Sapiro, "The LOCO-I lossless image compression algorithm: principles and standardization into JPEG-LS", *IEEE Trans. Image Process.*, vol. 9, No. 8, pp. 1309-1324, Aug. 2000.

Chinese Office Action from corresponding Chinese Patent Application No. 201280053919.6, dated Dec. 27, 2016.

* cited by examiner

Fig. 2a

Residual Block

| -17 | -31 | -8  | 1 |
|-----|-----|-----|---|
| 7   | -28 | -21 | 7 |
| -8  | -51 | -26 | 9 |
| -94 | -84 | -6  | 5 |

ICT →

Transformed Coefficients

| -86.2 | -61.7 | 41.2  | 25.3  |
|-------|-------|-------|-------|
| 46.0  | 48.6  | 5.1   | -11.0 |
| -30.7 | -41.9 | -29.2 | 9.0   |
| 3.3   | 7.9   | 7.8   | 0.8   |

Qstep = 20 →

Quantized Coefficients

| -4 | -3 | 2  | 1  |
|----|----|----|----|
| 2  | 2  | 0  | -1 |
| -2 | -2 | -1 | 0  |
| 0  | 0  | 0  | 0  |

Fig. 2b

Zigzag Scanning Order

| 1  | 2  | 6  | 7  |
|----|----|----|----|
| 3  | 5  | 8  | 13 |
| 4  | 9  | 12 | 14 |
| 10 | 11 | 15 | 16 |

| 0 | 0 | 0 | 0 |
|---|---|---|---|
| 0 | 0 | 0 | 0 |
| 1 | 1 | 0 | 0 |
| 0 | 0 | 0 | 0 |

Fig. 9a

| 1 | 2 | 3 | 4 |
|---|---|---|---|
| 5 | 6 | 7 | 8 |
| 15 | 16 | 9 | 10 |
| 11 | 12 | 13 | 14 |

Fig. 9b

| 1 | 0 | 0 | 0 |
|---|---|---|---|
| 0 | 1 | 0 | 0 |
| 0 | 0 | 0 | 0 |
| 0 | 0 | 0 | 0 |

Fig. 9c

| 15 | 6 | 2 | 1 |
|---|---|---|---|
| 11 | 16 | 5 | 3 |
| 12 | 10 | 7 | 4 |
| 14 | 13 | 9 | 8 |

Fig. 9d

LOSSLESS IMAGE AND VIDEO COMPRESSION

This application is a National Stage Application of PCT/SG2012/000408, filed 30, Oct. 2012, which claims benefit of U.S. Provisional Ser. No. 61/553,372, filed 31, Oct. 2011, and which applications are incorporated herein by reference. To the extent appropriate, a claim of priority is made to each of the above disclosed applications.

TECHNICAL FIELD

The present invention relates to methods and apparatus for performing lossless image or video compression. More particularly, the invention relates to methods and apparatus for encoding residual intra prediction blocks of images by modifying the statistical characteristics of residual data as well as scan order prior to entropy coding, and decoding said encoded residual intra prediction blocks.

BACKGROUND OF THE INVENTION

An increasing interest in lossless video compression techniques is observed in areas such as medical image coding and long-term image/video archiving. The desire for high compression lossless/near lossless compression algorithms is driven by economic reasons to keep the file size as small as possible for both transmission and storage while preserving high image/video quality. There is an urgent need for more efficient lossless/near lossless compression algorithms due to the recent introduction of high definition (HD) video to the consumer market. As compared to standard definition (SD) video, more details and textures are expected to be recorded in HD video.

Due to the overwhelming resolution, the transmission and storage requirements constitute a barrier to HD video streaming or broadcasting to end users in real time. However, the application has already been seen in movie theatres where live streaming of sports events or shows has become a steady revenue source for the content production community. From the archival viewpoint, lossless video coding is useful in maintaining contents in the most manageable package possible without discarding any important information.

The latest video coding standard, H.264/advanced video coding (AVC), was developed through the Joint Video Team (JVT) based on standardization of the International Telecommunications Union-Telecommunication (ITU-T) Video Coding Experts Group and the International Organization for Standardization (ISO)/International Electro-technical Commission (IEC) Moving Picture Experts Group. Due to its high-compression performance, H.264/AVC has become a promising video compression standard for a wide range of applications. These include multimedia streaming and video conferencing as described in, for example, *Editors' draft revision to ITU-T Rec. H.264|ISO/IEC 14496-10 Advanced Video Coding—in preparation for ITU*-T SG 16 *AAP Consent*, document JVT-AD205.doc, Joint Video Team of ISO/IEC 14496-10AVC, ISO/IEC JTC1/SC29/WG11, and ITU-T Q.6/SG16, February 2009; A. Luthra, G. J. Sullivan, and T. Wiegand, "Introduction to the special issue on the H.264/AVC video coding standard," *IEEE Trans. Circuits Syst. Video Technol.*, vol. 13, no. 7, pp. 557-559, July 2003; T. Wiegand, G. J. Sullivan, G. Bjontegaard, and A. Luthra, "Overview of the H.264/AVC video coding standard," *IEEE Trans. Circuits Syst. Video Technol.*, vol. 13, no. 7, pp. 560-576, July 2003; and G. J. Sullivan and T. Wiegand, "Video compression: From concepts to the H.264/AVC standard," *Proc. IEEE*, vol. 93, no. 1, pp. 18-31, January 2005. However, the development of the H.264/AVC standard has mainly focussed on lossy coding/compression techniques.

Lured by the growing lossless coding market, H.264/AVC has been developed to provide improved functionality for lossless video coding. H.264/AVC standard includes a so-called pulse-code modulation (PCM) macroblock coding mode, where the values of the original image samples are sent directly without prediction, transform, and quantization. The PCM mode was designed to be simple by imposing a minimum upper bound on the number of bits that can be used to represent a macroblock with sufficient accuracy. But, this aspect also reduced its coding efficiency as described in Y.-L. Lee, K. H. Han, and G. J. Sullivan, "Improved lossless intra-coding for H.264/MPEG-4 AVC," *IEEE Trans. Image Process.*, vol. 15, no. 9, pp. 2610-2615, September 2006.

After finalizing the first version of the H.264/AVC standard, JVT developed extensions to the original standard known as the fidelity range extensions (FRExt), for example, as described in *Draft Text of H.264/AVC Fidelity Range Extensions Amendment to ITU TRec. H.*264, document JVT-L047.doc, Joint Video Team of ISO/IEC14496-10 AVC, ISO/IEC JTC1/SC29/WG11, and ITU-T Q.6/SG16, July 2004 and further described in G. J. Sullivan, P. Topiwala, and A. Luthra, "The H.264/AVC standard: Overview and introduction to the fidelity range extensions," in *Proc. SPIE Conf., Special Session Adv. New Emerg. Standard: H.264/AVC*, Denver, Colo., August 2004, pp. 454-474. When developing the FRExt amendment, it was decided that a more effective means of lossless coding was desirable for the most demanding applications. Therefore, FRExt also included a transform-bypass lossless mode that employs two main coding processes, prediction and entropy coding, which were not previously used in the PCM macro-block mode, as described in *Intra-Lossless Coding and QP Range Selection*, document JVTC023.doc, Joint Video Team of ISO/IEC JTC1/SC29/WG11 and ITU-TQ.6/SG16, May 2002. More efficient coding techniques for prediction are still required to further enhance the coding performance for lossless coding.

In the meantime, a new intra-prediction method called sample-wise differential pulse-code modulation (DPCM) was introduced for lossless intra-prediction, see for example, *Differential pulse-code modulation (DPCM) Lossless Intra-Coding for Improved* 4:4:4 *Coding in H.264/MPEG-*4 *AVC*, document JVT-P016.doc, Joint Video Team of ISO/IECJTC1/SC29/WG11 and ITU-T Q.6/SG16, July 2005; and *Complexity of the Proposed Lossless Intra*, document JVT-Q035r1.doc, Joint Video Team of ISO/IEC JTC1/SC29/WG11 and ITU-T Q.6/SG16, October 2005. DPCM considers the sample next to the one to be predicted a better predictor than a sample in a neighboring block several samples farther away. As a result, sample-wise DPCM can provide better compression performance without incurring a major increase in the computational complexity. It was subsequently adopted as a part of the new draft amendment for the H.264/AVC standard in *Draft Text of H.264/AVC Advanced* 4:4:4 *Profile Amendment to ITUT Rec. H.264|ISO/IEC* 14496-10 *AVC*, document JVT-Q209.doc, Joint Video Team of ISO/IEC JTC1/SC29/WG11 and ITU-T Q.6/SG16, October 2005.

The H.264/AVC standard employs two entropy coders: context-based adaptive variable length coder (CAVLC) as described in *Context-Adaptive VLC (CVLC) Coding of Coefficients*, document JVTC028.doc, Joint Video Team of ISO/

IEC JTC1/SC29/WG11 and ITU-TQ6/SG16m, May 2002; and context-based adaptive binary arithmetic coder (CABAC) as described in D. Marpe, H. Schwarz, T. Wiegand, "Context-based adaptive binary arithmetic coding in the H.264/AVC video compression", *IEEE Trans. Circuits Syst. Video Technol.* vol. 13 (no. 7) (2003) 620-636. However, both entropy coding methods were designed to be adapted to the statistical characteristics of residual errors which are quantized transform coefficients. But, in lossless coding, residual errors are the differential pixel values between the original and the predicted pixel values without transform and quantization. The statistical characteristics of residual data for lossy coding and that for lossless video coding are very different. Conventional entropy coding methods used in H.264/AVC do not provide the best coding performance for lossless video coding.

In H.264/AVC intra coding, when given a 4×4 block, 9 modes of intra prediction are used for spatial redundancy reduction as shown in FIG. 1. This is also described in Y. W. Huang, et al, "*Analysis, Fast Algorithm, and VLSI Architecture Design for H.264/AVC Intra Frame Coder,*" *IEEE Trans. Circuits Syst. Video Technol.*, vol. 15, no. 3, March 2005, pp. 378-401. FIG. 2(a) illustrates an example of Integer Discrete Cosine Transform (ICT) and quantization for an intra-predicted error block of Mobile sequence explained in http://media.xiph.org/video/derf/. FIG. 2(b) is an example of the Zigzag Scanning order. For lossy coding, ICT and quantization are first applied to the input intra prediction residual block, which is followed by zigzag scan, whose scanning order is shown in FIG. 2(b). The scanned coefficients are sent to the entropy coder(s) for statistical redundancy removal.

It is noted that after ICT, the high magnitude coefficients tend to concentrate in the top-left of the block. After quantization, the top-left part of the block will have higher probability to have non-zero coefficients compared with bottom-right part of the block as shown in FIG. 2(a). This means that after the zigzag scan, the early part is more likely to have non-zero coefficients compared with the late part. Since the coefficients in the bottom-right corner tend to be small, after quantization, they are more likely to be quantized to consecutive zeros; the larger the quantization step is, the more zeros will be generated. The entropy coders in H.264/AVC are designed to exploit these statistical characteristics.

However, in lossless coding, the data sent to entropy coders are residual errors, which are the differential pixel values between the original and the predicted pixel values without ICT (transform) and quantization. Residual data differs from quantized coefficients in two aspects:
1) the residual data has fewer zero entries; and
2) all the positions in the prediction residual block have almost the same probability to have non-zero entries.

Conventional entropy coding methods in H.264/AVC simply cannot provide the best coding performance for lossless video coding. This severely limits the use of real-time lossless/near lossless video transmission and storage.

Applications for real-time lossless or near lossless video transmission and storage may include, for example, HD streaming, HD telepresence (requiring at least 24 Mbps bandwidth with 50 millisecond latency), remote surgery applications (typically requiring 10 Mbps and 1 millisecond latency), medical imaging and back-ups (hospitals storing 500,000 images per year may require 120 TB storage including back-up). However, most communication networks/storage systems cannot meet these requirements using existing lossless video coding technology. Even a simple 8% improvement in current compression rates can result in considerable savings in terms of bandwidth and storage requirements for lossless/near lossless video transmission and storage.

There is an increasing desire for higher lossless video compression rates.

SUMMARY OF THE INVENTION

It is an object of the present invention to provide a mechanism for modifying the statistical characteristics of lossless residual errors to allow entropy coders to achieve higher compression rates.

In a first aspect of the present invention, there is provided a method of encoding an intra predicted residual block of an image for use in image or video compression. The intra predicted residual block is associated with an intra prediction coding mode. The method includes generating a set of residual error blocks including residual data with different statistical characteristics from the residual data in the intra predicted residual block. Each of the residual error blocks is scanned and entropy coded to produce a first set of bit streams. The lengths of each of the first set of bit streams are recorded. The intra predicted residual block is also scanned and entropy coded to produce a second bit stream. The length of the second bit stream is recorded. The minimum length bit stream from the first set of bit streams and the second bit stream is selected as the output coded bit stream of the intra predicted residual block.

As an option, generating the set of residual error blocks includes subtracting the intra predicted residual block from a weighted set of predefined template blocks associated with the intra prediction coding mode. Note that the term "subtracting" is used here in the sense of "finding the difference" i.e. it is applicable irrespective of which of the two operands is subtracted from the other. Each predefined template block is a binary matrix associated with a specific scanning order.

Optionally, each of the first set of bit streams includes header data representative of information associated with the corresponding residual error block.

As an option, the steps of generating the set of residual error blocks and scanning and entropy coding each of the residual error blocks further includes:
  generating the first set of bit streams for each scale factor, $a_j$, from a plurality of scale factors and for each template block, $W_k$, from a plurality of predefined template blocks associated with the intra prediction coding mode by:
    calculating a residual error block, $R_i$, by subtracting the intra predicted residual block, $X_i$, from a weighted predefined template block, $a_j W_k$, the weighted predefined template block comprising said each predefined template block multiplied with said each scale factor;
    scanning $R_i$ with the corresponding scanning order associated with $W_k$;
    entropy coding the scanned $R_i$ outputting a coded bit stream for including in the first set of bit streams; and
    recording the length of the output coded bitstream, $l(a_j, W_k)$.

Optionally, the method includes the step of selecting from the first set of bit streams a first coded bit stream having the minimum recorded length.

As an option, each of the first coded bit streams includes header data representative of the scale factor associated with the corresponding first coded bit stream. In addition, each of the first coded bit streams may include header data representative of the predefined template block associated with the corresponding first coded bit stream.

As an option, the step of scanning and entropy coding the intra predicted residual block, $X_i$, further includes:
scanning, $X_i$, with a zigzag scanning order;
entropy coding the scanned $X_i$ to output the second coded bit stream; and
recording the length of the second coded bit stream.

Optionally, the method includes the steps of comparing the recorded length of the first coded bit stream with the recorded length of the second coded bit stream, and selecting the first coded bit stream as the output bit stream when the minimum recorded length is less than the recorded length of the second coded bit stream.

According to second aspect of the invention, there is provided a method of decoding an encoded intra predicted residual block of an image for use in image or video decompression. The encoded intra predicted residual block is associated with an intra prediction coding mode. The method includes detecting header information associated with encoding a residual error block including residual data with different statistical characteristics from the residual data in the intra predicted residual block. Generating the residual error block by entropy decoding and de-scanning the encoded intra predicted residual block. Applying the header information to the residual error block to output the intra predicted residual block for use in decoding the image.

According to a third aspect of the invention there is provided an apparatus for encoding an intra predicted residual block of an image for use in image or video compression. The intra predicted residual block is associated with an intra prediction coding mode. The apparatus comprising a generation unit, a scanning unit, an entropy coding unit and memory coupled together. The generation unit is configured for generating a plurality of residual error blocks including residual data with different statistical characteristics from the residual data in the intra predicted residual block. The scanning unit is configured for scanning each of the residual error blocks to produce a plurality of scanned residual blocks, and for scanning the intra predicted residual block to produce a scanned intra predicted residual block. The entropy coding unit is configured for entropy coding each of the scanned residual error blocks to produce a first plurality of bit streams, and entropy coding the scanned intra predicted residual block to produce a second bit stream. The memory unit is configured for recording the lengths of each of the first plurality of bit streams and the length of the second bit stream. The selection unit is configured for selecting the minimum length bit stream from the first plurality of bit streams and the second bit stream as the output coded bit stream of the intra predicted residual block.

According to fourth aspect of the present invention, there is provided an apparatus for decoding an encoded intra predicted residual block of an image for use in image or video decompression. The encoded intra predicted residual block is associated with an intra prediction coding mode. The apparatus comprising a detection unit, an entropy decoding and scanning unit, and a generation unit coupled together. The detection unit is configured to detect header information associated with encoding a residual error block including residual data with different statistical characteristics from the residual data in the intra predicted residual block. The entropy decoding and scanning unit is configured to generate the residual error block by entropy decoding and de-scanning the encoded intra predicted residual block. The generation unit is configured to apply the header information to the residual error block to output the intra predicted residual block.

According to another aspect of the invention there is provided a method for generating one or more predefined template blocks for use in the methods and apparatus for encoding and decoding as described herein. The method includes generating one or more predefined template block associated with the intra prediction coding mode by minimizing:

$$W_{opt} = \underset{W}{\operatorname{argmin}} \sum_i \|vec(X_i - a_i W)\|_0$$

$$\text{s.t } W(r, c) \in \{0, 1\},$$

where $X_i$ is a given n×n intra predicted residual block associated with the intra prediction coding mode, W is an n×n the template block from the set of template blocks in which each entry is either a zero or one, $a_i$ is a scale integer having a predefined range, vec( ) is a vectorization operator that turns all the matrix elements to a vector form in the row by row order, and $\|.\|_0$ is the L0-Norm for calculating the total number of non-zero elements of a vector, where binary matrix $W_{opt}$, is the first template block, in which for a given group of one or more intra predicted residual blocks $X_1 \ldots X_i \ldots X_n$ associated with the intra prediction mode, the number of non-zero coefficients is minimized.

As an option, the method further includes generating a second predefined template block by performing the step of determining a second time, where the first template block is excluded from the set of template blocks during the second minimization such that the binary matrix $W_{opt}$, is the second template block, in which for a given group of one or more intra predicted residual blocks $X_1 \ldots X_i \ldots X_n$ associated with the intra prediction mode, the number of non-zero coefficients is minimized.

Optionally, when the intra prediction mode is 0 and the residual intra prediction block is a 4×4 block, then the plurality of predefined template blocks includes at least one block selected from the group of template blocks as described herein with reference to FIG. 4. Additionally, the scanning order for the group of template blocks may be a row by row, top to bottom, left to right order, in which '0' positions are scanned first and '1' positions are scanned last.

As an option, when the intra prediction mode is 1 and the residual intra prediction block is a 4×4 block, then the plurality of predefined template blocks includes at least one block selected from the group of template blocks as described herein with reference to FIG. 5. Additionally, the scanning order for the group of template blocks may be a column by column, left to right, top to bottom order, in which '0' positions are scanned first and '1' positions are scanned last.

Optionally, when the intra prediction mode is 3 and the residual intra prediction block is a 4×4 block, then the plurality of predefined template blocks includes at least one block selected from the group of template blocks as described herein with reference to FIG. 6. Additionally, the scanning order for the group of template blocks may be the scanning order is the reflection of zigzag order with '1' positions reordered, in which '0' positions are scanned first and '1' positions are scanned last.

As an option, when the intra prediction mode is 4 and the residual intra prediction block is a 4×4 block, then the plurality of predefined template blocks includes at least one block selected from the group of template blocks as described herein with reference to FIG. 7. Additionally, the scanning order for the group of template blocks may be a zigzag order in which '0' positions are scanned first and '1' positions are scanned last.

Optionally, when the intra prediction mode is 2 and the residual intra prediction block is a 4×4 block, then the plurality of predefined template blocks includes at least one block selected from the group of template blocks as described herein with reference to FIG. 8. Additionally, the scanning order for the group of template blocks may be, with reference to FIG. 8 as described herein:
- (a) to (b) is a row by row, top to bottom, left to right order;
- (c) to (f) is a column by column, left to right, top to bottom order;
- (g) to (k) is the reflection of zigzag order; and
- (l) to (p) is the zigzag order;

in which '0' positions are scanned first and '1' positions are scanned last.

Embodiments of the present invention provide a relatively simple and efficient mechanism for compressing lossless/near lossless images or video sequences. A particular application of the invention involves those images used in medical imaging. Of course, the invention may be used for other image and video formats and combinations thereof. The invention may be expressed as a method, as an apparatus for carrying out the method, for example including a processor and a tangible data-storage device for storing, in a non-transitory form, program instructions operable by the processor to cause the processor to carry out the method.

BRIEF DESCRIPTION OF THE DRAWINGS

Some embodiments of the invention will now be described by way of example only and with reference to the accompanying drawings, in which:

FIG. 2a illustrates an example of ICT and quantization for an intra-predicted error block;

FIG. 2b illustrates an example of the zigzag scanning order;

FIG. 4, which is composed of FIG. 4(a) to 4(p), illustrates an example of 16 mode dependent template blocks associated with mode 0;

FIG. 5, which is composed of FIG. 5(a) to 5(p), illustrates an example of 16 mode dependent template blocks associated with mode 1;

FIG. 6, which is composed of FIG. 6(a) to 6(p), illustrates an example of 16 mode dependent template blocks associated with mode 3;

FIG. 7, which is composed of FIG. 7(a) to 7(p), illustrates an example of 16 mode dependent template blocks associated with mode 4;

FIG. 8, which is composed of FIG. 8(a) to 8(p), illustrates an example of 16 mode dependent template blocks associated with mode 2;

FIG. 9(a) illustrates an example mode dependent template block for mode 0;

FIG. 9(b) illustrates the corresponding scanning order associated with the template block of FIG. 9(a);

FIG. 9(c) illustrates an example mode dependent template block for mode 3;

FIG. 9(d) illustrates the corresponding scanning order associated with the template block of FIG. 9(c);

DETAILED DESCRIPTION

Figure 1:
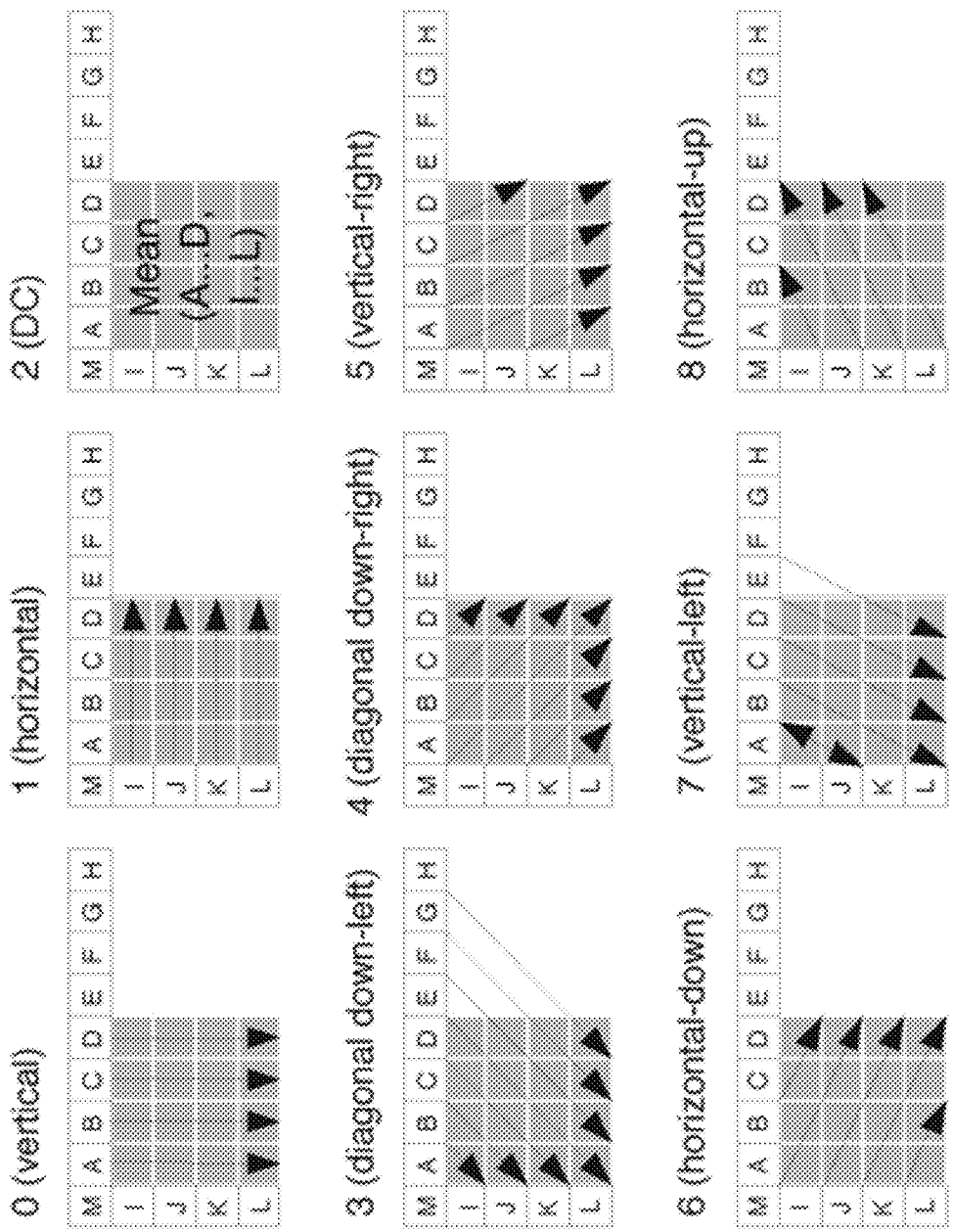
FIG. 1 illustrates schematically the 9 modes of intra prediction used in the H.264/AVC standard.

In order to overcome the problems identified above there will now be described methods and apparatus for performing lossless/near lossless video coding for achieving higher compression rates. Embodiments and examples of the invention are based on the concept of customising the statistical characteristics of lossless residual errors to allow better entropy coding that can achieve higher compression rates. The statistical correlation of prediction residual errors within Intra prediction modes are analysed and template blocks derived that may be subtracted from the blocks for each intra prediction mode, the template blocks are also referred to herein as mode dependent templates (MD-Templates). This generates more zeros entries; by designing the scanning order for each template, the earlier part of the scanned coefficient sequence has a higher probability to have non-zeros coefficients compared with the later part. In this way, the processed result is more suitable for entropy coding methods in lossless/near lossless video coding such as, for example, H.264/AVC or H.265 and other suitable image/video coding standards/techniques. Examples are illustrated showing considerable savings in terms of bits can be achieved by the encoding/decoding methods based on MD-Templates according to the invention compared with other lossless/near lossless coding techniques such as the H.264/AVC fidelity range extensions high profile coding method.

In particular, to use the template blocks for modifying the statistical characteristics of lossless residual errors, they need to be defined. The template blocks (MD-Templates) can be derived for each intra prediction mode as follows:

$$W_{opt} = \underset{W}{\arg\min} \sum_i \|vec(X_i - a_i W)\|_0 \quad (1)$$

$$\text{s.t } W(r, c) \in \{0, 1\},$$

where $X_i$ is a given 4×4 matrix or block, which represents a intra predicted residual block belonging to one of the 9 intra prediction modes; W is a 4×4 binary matrix with each entry being either zero or one, which represents the template block (MD-Template) that is to be derived; $a_i$ is a scale integer ranging from −255 to 255. Note that in variations of the embodiment within the scope of the invention, the block size may differ, such as an 8×8 or 16×16 block size. In some embodiments after the mode decision, some or all the 16×16 macro-blocks may be divided into 16 4×4 blocks. The range of values for $a_i$ is selected in view of the fact that the bit depth of most video formats is 8 bits, so intensity ranges from 0-255 for each pixel. Therefore, the range of values of the result of subtracting two pixel intensities is −255 to 255. If another bit depth is used, e.g. 10 bits/pixel, the range of values for $a_i$ may be changed.

The operator vec( ) is a vectorization operator, which turns all the matrix elements to a vector form in the row by row order. For example, suppose B is any m×m matrix, after vectorization, we have the vector in equation (2), where each $B_{r,c}$ is an element of B at the position (r,c).

$$\text{Vec}(B) = [b_{1,1}, b_{1,2} \ldots b_{1,m}, b_{2,1}, b_{2,2}, \ldots b_{2,m}, \ldots b_{m,1}, b_{m,2} \ldots b_{m,m}] \quad (2)$$

By using the L0-Norm, $\|.\|_0$, (that is the total number of non-zero elements of a vector), the minimization problem defined in equation (1) outputs a binary matrix $W_{opt}$, such that for a given group of one or more intra predicted residual blocks $X_1 \ldots X_i \ldots X_n$, which belong to a certain intra prediction mode, the number of non-zero coefficients is minimized. For intra predicted residual blocks, $\|.\|_0$ provides the number of non-zero coefficients for an input vector. However, the L0-Norm minimization problem of equation (1) is NP-complete so an exhaustive search can be performed by calculating the generated non-zero coefficients for all possible W, which for 4×4 blocks involves searching $2^{16}$=65536 cases.

For example, a detailed learning process may be performed on selected testing images for deriving the MD-Templates W suitable for each mode. Example images may include, but are not limited to, testing images such as: airplane, baboon, barbara, boats, goldhill, lenna, peppers, bridge, cameraman, clown, sailboat and crown. Most of these test images are available at http://www.hlevkin.com/TestImages/.

Moreover, among the 9 intra prediction modes, the first 5 modes have higher occurrence probabilities than the remaining 4 modes as described in Germany. H. Q. Zeng, K. K. Ma, C. H. Cai, "*Hierarchical Intra Mode Decision for H.264/AVC*," IEEE Trans. Circuits Syst. Video Technol., vol. 20, no. 6, pp. 907-912, 2010. From these test images, the probability distribution of selected intra prediction modes can be derived and is shown below in Table 1.

TABLE 1

Probability distribution of selected intra prediction modes

| Intra Prediction Mode | Probability |
|---|---|
| Mode 0 | 0.302 |
| Mode 1 | 0.262 |
| Mode 2 | 0.182 |
| Mode 3 | 0.071 |
| Mode 4 | 0.074 |
| Mode 5 | 0.024 |
| Mode 6 | 0.035 |
| Mode 7 | 0.021 |
| Mode 8 | 0.029 |

In this example, as indicated in Table 1, Mode 0 to Mode 4 account for more than 89% of prediction modes for intra prediction. The number of MD-Templates can be reduced to these five modes.

Figure 3:
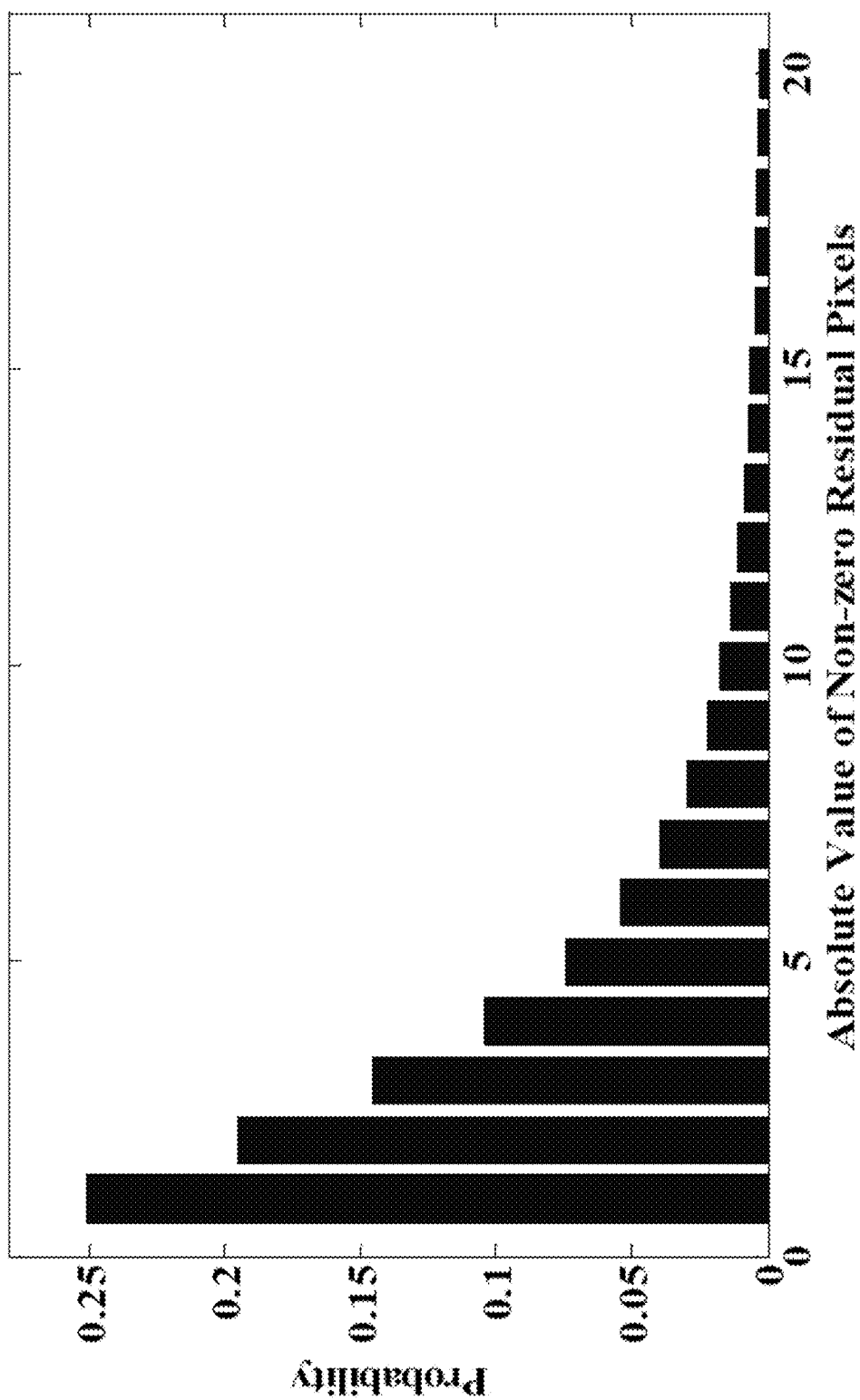
FIG. 3 illustrates the probability distribution of the absolute values of non-zero coefficients for the residual blocks derived for a range of testing images.

FIG. 3 is a graph illustrating the probability distribution of the absolute values of non-zero coefficients for the residual blocks derived from these testing images, the first 20 non-zero coefficients in the residual blocks are illustrated. It can be seen that more than 73% of non-zero prediction residual values range from −4 to 4. This allows further simplification for constraining the scale integer, $a_i$, to be in the range [−4,−3,−2,−1] and [1, 2, 3, 4]. However, it is to be appreciated by the skilled person that that other suitable ranges for the scale integer, $a_i$, may be selected or derived for achieving a predefined or suitable compression rate.

Once a W block out of the 65536 cases is chosen, the optimal $a_i$ is determined, for each $X_i$. For each intra prediction mode, 16 MD-Templates $W_1$ to $W_{16}$ may be selected, which are the top 16 binary matrices in terms of L0-Norm minimization for equation (1). For example, $W_1$ gives the least number of non-zero coefficients, $W_2$ gives the second least number of non-zero coefficients and so on. Note that the number of templates may be different, and for example the embodiment may use 32 or even more templates. However, using more templates introduces more overhead to represent these templates. According to experimental results, 32 templates do not yield a significant performance improvement, so 16 templates are used in this embodiment to reduce computational requirements.

Figure 4:
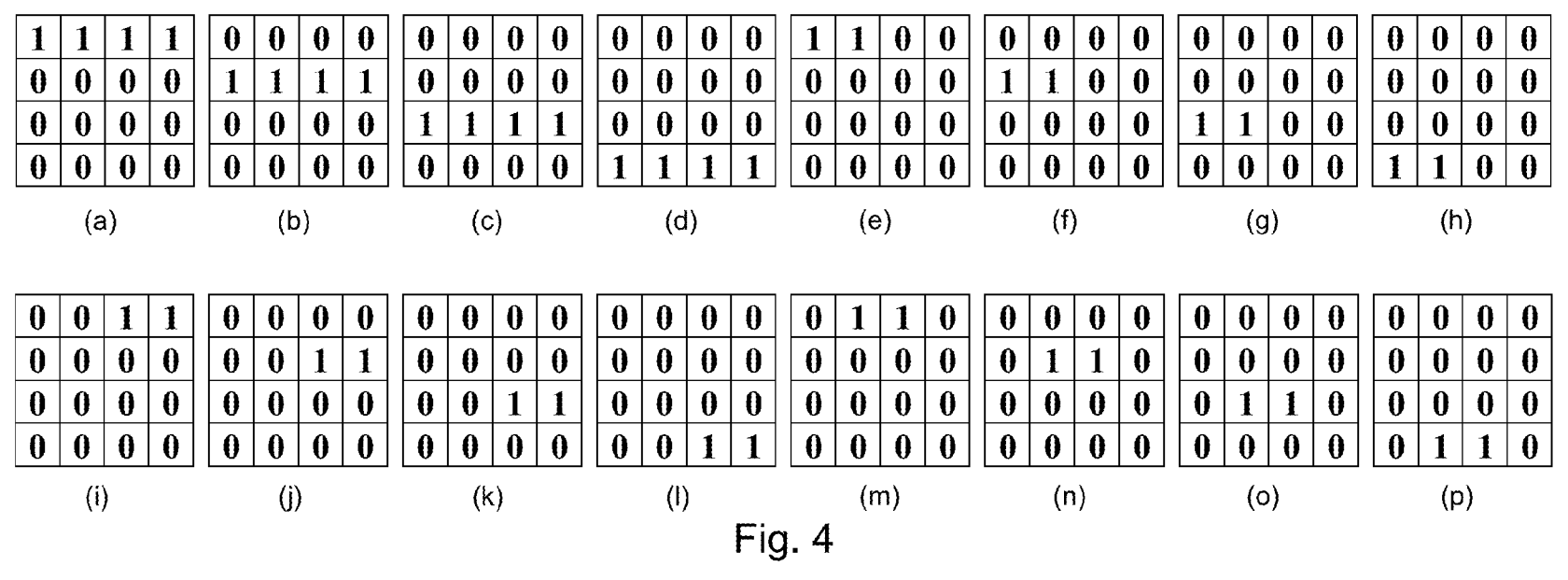
Figure 5:
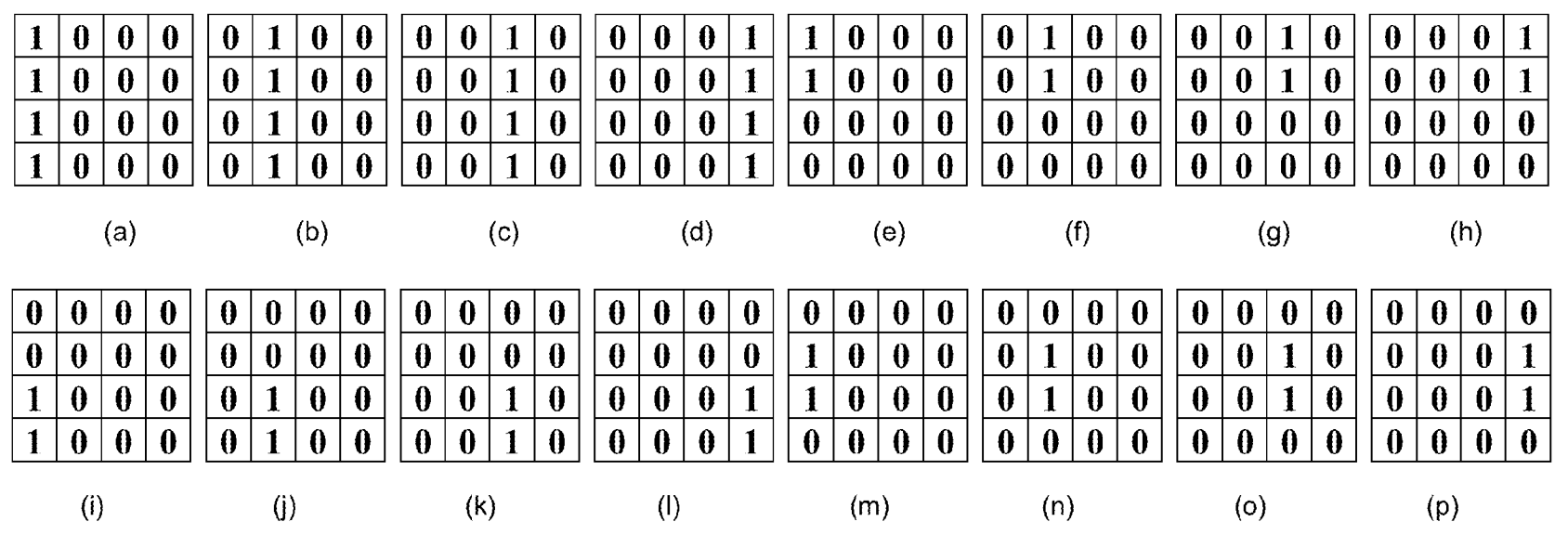
Figure 6:
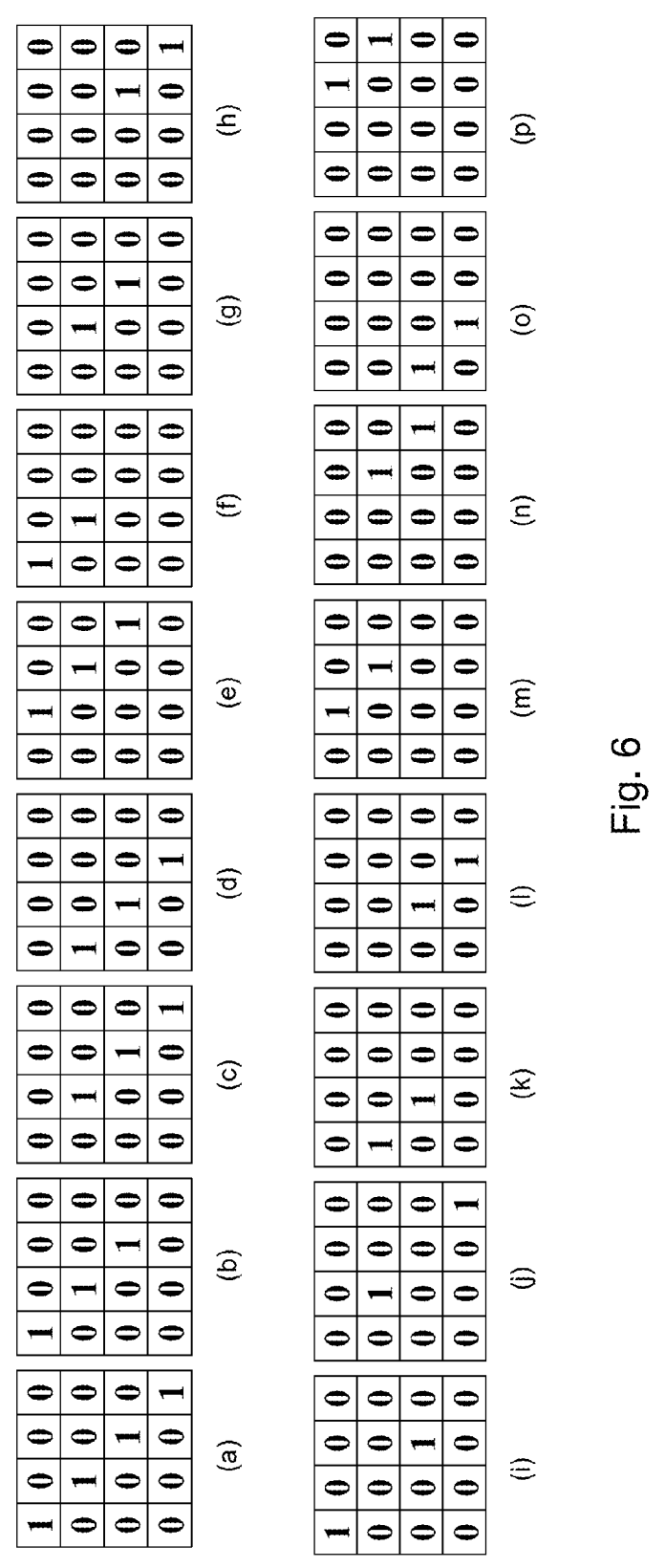
Figure 7:
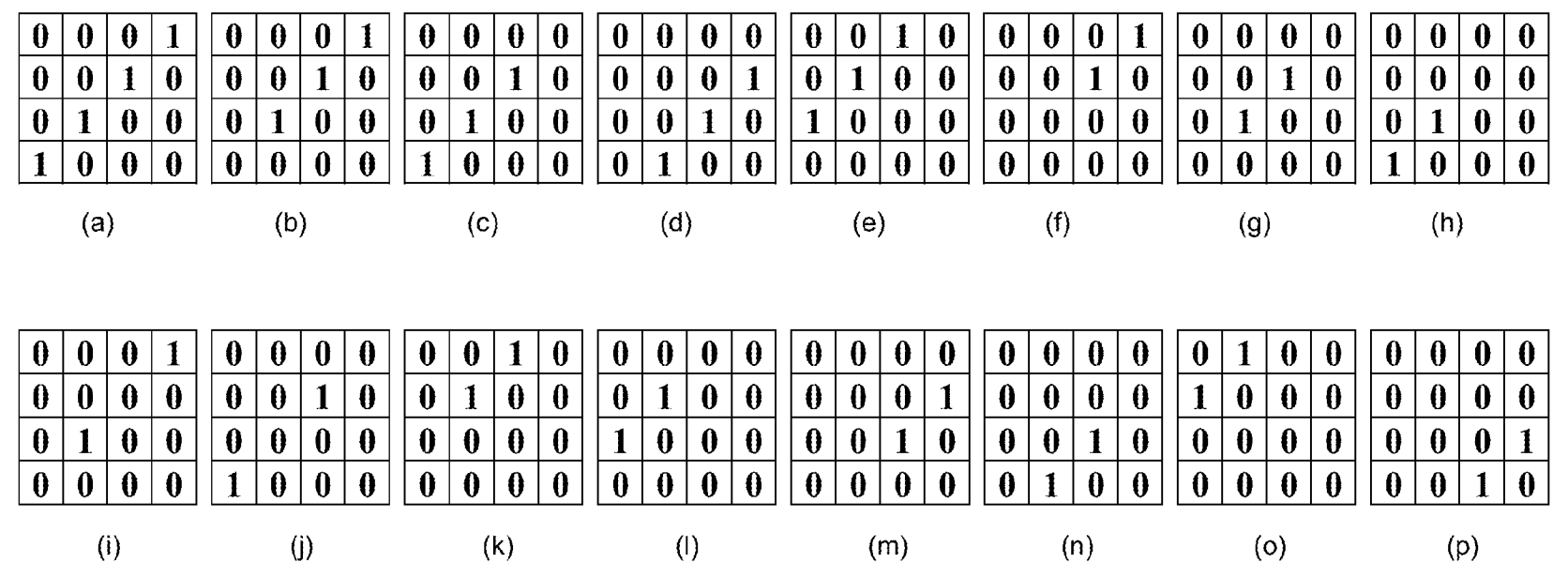

FIG. 4 illustrates the 16 MD-Templates for intra prediction mode 0. FIG. 5 illustrates 16 MD-Templates for intra prediction mode 1. FIG. 6 illustrates 16 MD-Templates for intra prediction mode 3. FIG. 7 illustrates 16 MD-Templates for intra prediction mode 4. However, for mode 2, no dominate MD-Templates were derived from the above test images, so in this case, 16 MD-Templates illustrated in FIG. 8 can be used. Note that if the test images had been different, it is possible that a different set of MD-templates would have been generated. However, the MD-templates shown in FIGS. 4-8 were obtained by extensive experimental tests, and their value is clear from the experiments discussed later.

The MD templates for an intra prediction mode can now be used for encoding the residual intra prediction blocks associated with that intra prediction mode. This may be performed by generating a residual error block by subtracting the residual intra prediction block, $X_i$, with a selected one of the 16 MD-Templates associated with the intra prediction mode. After we subtract the residual intra prediction block, $X_i$, by one of the 16 MD-Templates, a new scanning order may be defined based on the selected MD-Template.

For example, for mode 0, the scanning order may be defined in a row by row, top to bottom, left to right order. Note that this is just one option which has proved to be effective, and other options are possible within the scope of the invention. The criterion for designing the scanning order is to make the scanned sequence has more zero coefficients at the end part. Scanning is first performed on those positions in the MD template labeled '0' and then followed by those labeled with '1', as illustrated in FIGS. 9(a) and 9(b). FIG. 9(a) illustrates an MD-Template for mode 0 and FIG. 9 (b) illustrates the corresponding scanning order of the MD-Template for FIG. 9 (a).

Figure 8:
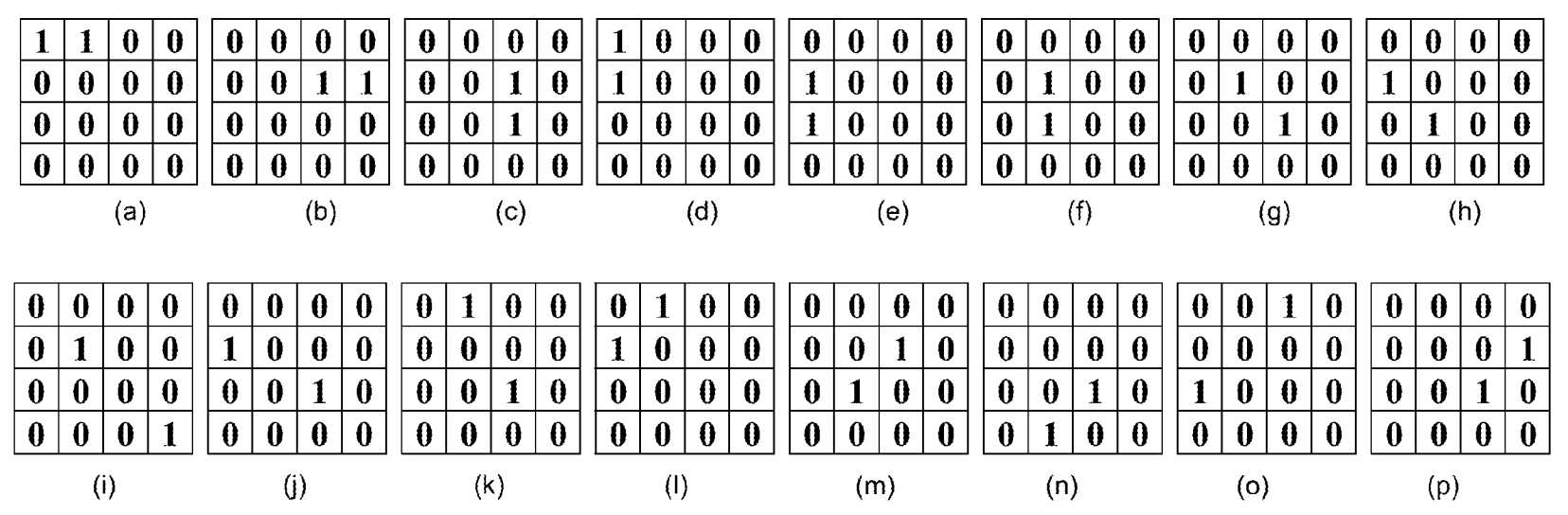

Similarly, the scanning order for mode 1 is in a column by column, left to right, top to bottom order with '1' positions reordered. For mode 4, the scanning order is zigzag order with '1' positions reordered. For mode 3, the scanning order is the reflection of zigzag order with '1' positions reordered, as shown in FIGS. 9(c) and (d). FIG. 9 (c) illustrates an MD-Template for mode 3. FIG. 9 (d) illustrates the corresponding scanning order of MD-Template for FIG. 9 (c). For mode 2, for MD-Templates (a) to (b) as illustrated in FIG. 8, the scanning is the same as in mode 0. For MD-Templates (c) to (f) as illustrated in FIG. 8, the scanning is the same as mode 1. For MD-Templates (g) to (k) as illustrated in FIG. 8, the scanning order is the same as mode 3. Finally, for MD-Templates (l) to (p) as illustrated in FIG. 8, the scanning order is the same as mode 4.

The residual error block is then scanned and entropy coded to output a bit stream of the encoded residual intra prediction block for an image for use in video compression. Data representative of the scale factor and the MD Template used for encoding the residual intra prediction block may be included into the output bit stream to allow decoding of the encoded residual intra prediction block.

In another embodiment an example process according to the present invention is provided that uses the above example method for performing intra lossless/near lossless coding using MD-Templates. The example process may be performed based on the below described pseudo-code. In this example, it is assumed that the H.264/AVC lossless encoding method is used. However, it is to be appreciated that any other lossless/near lossless encoding method based on using intra residual prediction blocks is applicable (e.g. H.265)

Figure 10:
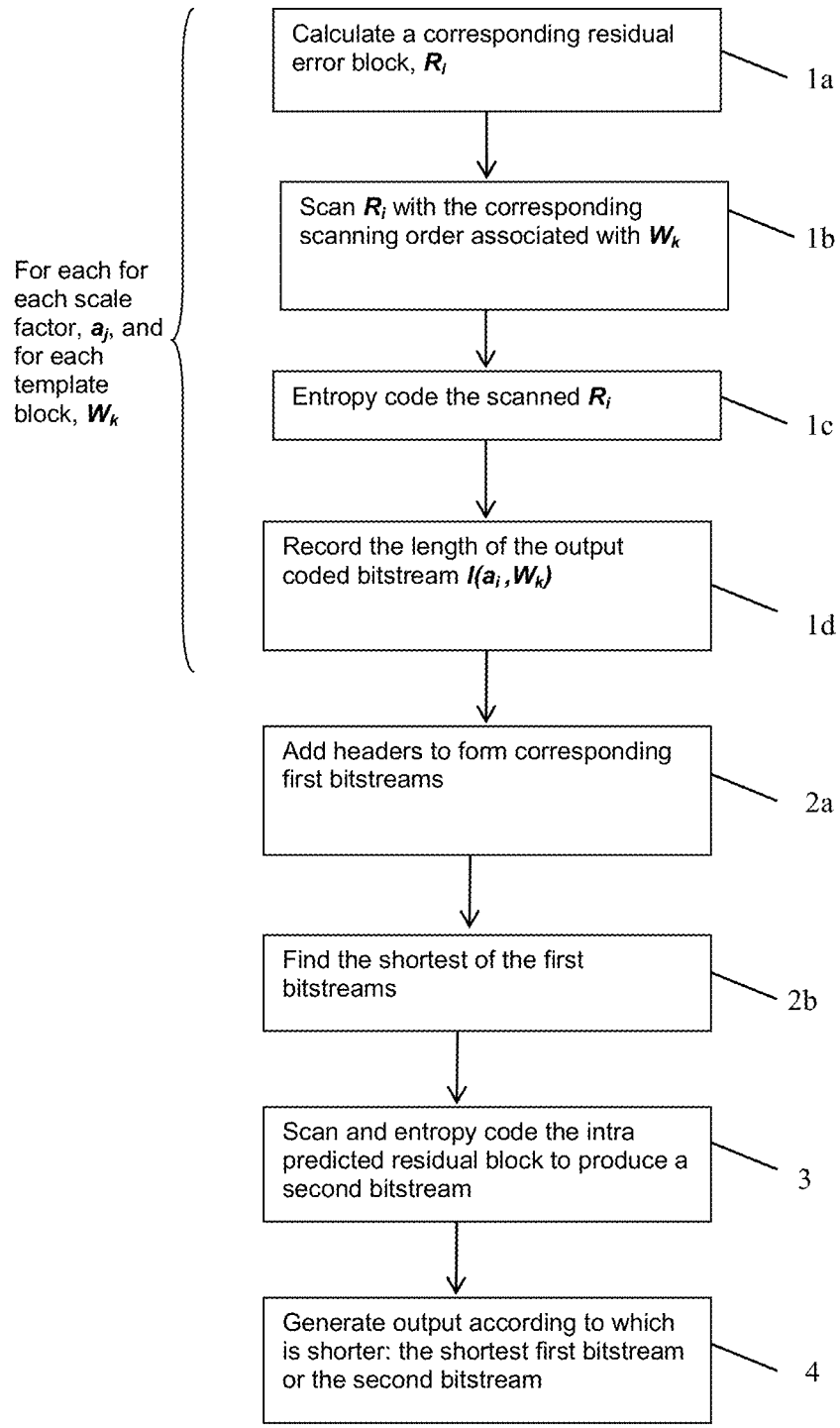
FIG. 10 is a flow diagram showing a set of steps carried out in an embodiment of the invention.
Figure 11:
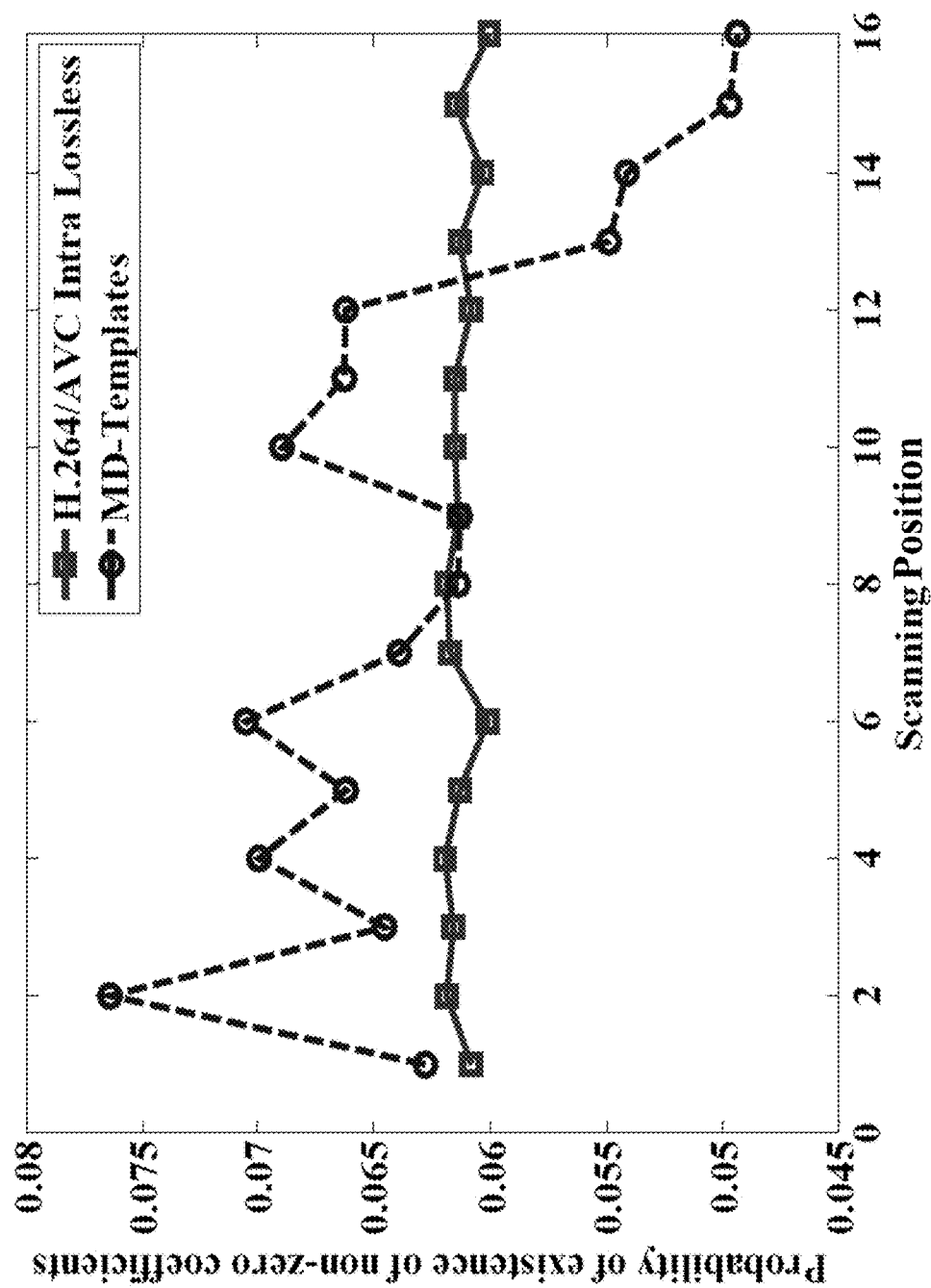
FIG. 11 illustrates the probability distribution of the existence of non-zero coefficients versus scanning position before and after using MD templates method for a test image sequence.

For each intra residual prediction block $X_i$ belonging to a certain mode, for example, among modes 0 to 4, the following algorithm determines whether or not an MD-Template is used to code the intra residual prediction block $X_i$. For Inputs: $X_i$; and Outputs: The coded bitstream, the example process performs the following steps:

1) for $a_i=-4:-1, 1:4$
   for W=MD-Template(a): MD-Template(p)
     calculate $R_i=X_i-a_iW$;
     scan $R_i$ with the corresponding scanning order of W.
     code the scanned $R_i$ with entropy coder (CAVLC) in H.264/AVC and
     record the length of the derived bitstream $I(a_i,W)$
   end
  end
2) add the corresponding overhead bits $H(a_i,W)$ to $I(a_i,W)$ and choose the one with least bits, L=min $(H(a_i,W)+I(a_i,W))$.
3) code $X_i$ with zigzag scanning and entropy coder (CAVLC) in H.264/AVC and record the length of derive bitstream $I_{H.264}$
4) if $L<I_{H.264}$
   code the residual block with MD-Template method
  else
   code the residual block with conventional H.264/AVC lossless method
  end The steps above are represented in FIG. 10. Step 1 is shown as having sub-steps 1a, 1b, 1c and 1d, and step 2 is shown as having sub-steps 2a and 2b.

In addition to the coded output bits, some syntax elements are also added into the bitstream for use in decoding the encoded residual intra prediction block $X_i$. For example, for each coded block in the bitstream, following the syntax of intra-prediction mode information, where 1 bit is used to indicate whether this block is coded with the MD-Template method. However, if the block $X_i$ is coded with the standard intra H.264-LS method, the standard CAVLC codeword is followed. If this block is coded with the M<D-Template method, the codeword of scaling integer $a_i$ (refer to Table 2) and codeword of MD-Template used for this block (4 bits for each template) are inserted before the CAVLC codeword.

TABLE 2

Codeword Table for Coefficients $a_i$

| Value of $a_i$ | Sign bit | Code bits |
|---|---|---|
| 1 | 1 | 1 |
| −1 | 0 | 1 |
| 2 | 1 | 01 |
| −2 | 0 | 01 |
| 3 | 1 | 001 |
| −3 | 0 | 001 |
| 4 | 1 | 000 |
| −4 | 0 | 000 |

Although Table 2 shows various the codewords for scaling integer $a_i$, it is to be appreciated by the person skilled in the art that any other codeword, field, symbol of flag may be used to represent the scaling integer $a_i$.

FIG. 10 illustrates the probability distribution of the existence of non-zero coefficients versus scanning position before and after using MD-Templates for the CIF Mobile sequence referred to in the background section of this document. As observed, before using MD-Templates, each position almost has the same probability to have non-zero coefficients (the solid line with squares); while after using MD-Templates, the position at the early part tends to be more likely to have non-zero coefficients compared with the late part of the scanning position (the dashed line with circles).

In addition, Table 3 illustrates the number of zero coefficients before and after using MD-Templates method for 9 image test sequences with different resolution. The test sequences are available at http://media.xiph.org/video/derf/. As observed, after applying MD-Templates method, it is apparent that approximately 1.53 more zero coefficients are generated on average.

TABLE 3

Number of zero coefficients comparison

| Sequences | | H.264/AVC Lossless | MD-Templates |
|---|---|---|---|
| QCIF | Container | 2.44 | 3.21 |
| | Foreman | 2.25 | 4.97 |
| | Silent | 1.90 | 3.88 |
| CIF | Paris | 2.26 | 4.54 |
| | Mobile | 1.37 | 2.55 |
| | Tempete | 1.73 | 3.02 |
| 720P | Crowd run | 1.37 | 2.51 |
| | Park run | 1.26 | 2.39 |
| | City_corr | 1.53 | 2.77 |
| Average zero coefficients | | 1.79 | 3.31 |
| Average zero coefficients over H.264 | | | 1.53 |

Further advantages and improvements over existing lossless coding methods, devices or materials are shown in the following examples. In order to show the effectiveness of the MD-Template based lossless intra coding according to the methods and processes as described above, 9 test sequences with different resolutions are used as follows:
   3 QCIF (144×176) sequences;
   3 CIF (288×352) sequences; and
   3 720P HD (720×1280) sequences,
each sequence with 200 YUV 4:2:0 frames and 8 bits per pixel (bpp). All the frames are coded losslessly as intra frames. Entropy coding is performed with context-adaptive variable-length-codes (CAVLC). $a_i$, which takes integer value from [−4,−3,−2,−1] to [1,2,3,4] is coded according to the codewords illustrated in Table 2. For each mode, the 16 MD-Templates are coded with 4 bits.

Table 4 illustrates further improvements of the methods and processes according to the invention based on MD-Templates by comparing the bits saving and compression ratio between a) the MD-Templates based methods; b) the H.264 intra lossless coding; and lossless JPEG (JPEG-LS) as described in M. J. Weinberger, G. Seroussi, G. Sapiro, "The LOCO-lossless image compression algorithm: principles and standardization into JPEG-LS", *IEEE Trans. ImageProcess*. Vol. 9, no. 8, pp. 1309-1324, 2000, which is also a widely used commercial lossless coder.

In this example, the Compression Ratio=Original Video Size/Coded Video Size; and Bit Saving(%)=(Coded Video $Size_{H.264}$-Coded Video $Size_{MD\text{-}Templates}$)/Coded Video $Size_{H.264} \times 100$. In Table 4, the numbers in bold are the best results among the three lossless intra coding methods.

TABLE 4

Compression Ratio and Bits saving Comparison for H.264/AVC Intra lossless (with CAVLC), JPEG Lossless and MD-Templates (with CAVLC)

| | | Compression Ratio | | | Bits Saving (%) |
|---|---|---|---|---|---|
| | Sequences | H.264/AVC Lossless | JPEG Lossless | MD-Templates | Compared with [11] |
| QCIF | Container | 2.26 | 2.25 | 2.45 | 7.83 |
| | Foreman | 2.19 | 2.07 | 2.40 | 8.84 |
| | Silent | 2.05 | 2.04 | 2.24 | 8.72 |
| CIF | Paris | 2.03 | 2.04 | 2.23 | 8.83 |
| | Mobile | 1.63 | 1.58 | 1.79 | 9.12 |
| | Tempete | 1.88 | 1.90 | 2.05 | 8.30 |
| 720P | Crowdrun | 2.11 | 1.89 | 2.25 | 6.41 |
| | Parkrun | 2.05 | 1.69 | 2.19 | 6.73 |
| | City | 2.13 | 2.10 | 2.29 | 6.80 |
| Average | | 2.03 | 1.95 | 2.21 | 7.94 |

The methods and processes according to the present invention may be used in other applications such as medical image compression and storage. This is one of the primary applications for lossless image or video compression. For example, DICOM (Digital Imaging and Communications in Medicine) is a standard for handling, storing, printing, and transmitting information in medical imaging. It includes a file format definition and a network communications protocol. The communication protocol is an application protocol that uses TCP/IP to communicate between systems. DICOM files can be exchanged between two entities that are capable of receiving image and patient data in DICOM format.

In its latest standard, DICOM incorporated these image compression formats:
1) JPEG IMAGE COMPRESSION
2) Run Length Encoding Compression
3) JPEG-LS IMAGE COMPRESSION
4) JPEG 2000 IMAGE COMPRESSION
5) MPEG2 MP@ML (Main Profile at Middle Level) IMAGE COMPRESSION
6) MPEG2 MP@HL (Main Profile at High Level) IMAGE COMPRESSION
7) MPEG-4 AVC/H.264 High Profile/Level 4.1 Video Compression Among these formats, MPEG-4 AVC/H.264 High Profile is the latest added version for its high compression ratio and internet compatibility. However, for lossless image coding, which is strongly recommended by DICOM experts and radiologists, DICOM still uses JPEG-LS and JPEG 2000, which was developed a decade ago. Compression of images into small file sizes is extremely important, because the transmission has to be done as efficiently and quickly as possible and the storage needs to be minimized.

Embodiments of the methods and processes of the MD-Template according to the present invention may be use in medical image compression. The lossless compression efficiency is compared between JPEG 2000 and the MD-Template based method for a various medical images. The comparison results are summarized in Table 6. For these tests, three classes of medical images were used in the comparison. Class A images are medical images of human brains, Class B images are medical images of brain blood vessels, while Class C images are medical images of the human body. These are standard images, available at http://www.dicom7.com/. Table 5 is a list of the resolutions (image sizes) for these medical images.

TABLE 5

A summary of medical images used in the test

| Class | Image Fold | Resolution |
|---|---|---|
| A | sT2-TSE-T - 301 | 256 × 256 |
| | T1-SE-extrp - 601 | |
| | T1-3D-FFE-C - 801 | |
| | sT2W-FLAIR - 401 | 288 × 288 |
| | T2W-FE-EPI - 501 | 512 × 512 |
| | T1-SE-extrp - 701 | |
| | SOUS - 702 | |
| B | IDEFIX | 1024 × 1024 |
| C | LOMBAIRE FACE | 1720 × 2320 |
| | PA - 3 | 2320 × 2828 |
| | | 2320 × 2920 |

In the tests, the compression performance of JPEG2000 lossless coding is compared with the Mode Dependent Template (MD-Template) method based on H.264 Intra lossless coding (H.264-LS). The comparison result is summarized in Table 6. The Bit Saving is calculated in equation (3) as follows:

$$\text{Bit Saving (\%)} = \frac{Bitrate_{JPEG2000} - Bitrate_{Proposed}}{Bitrate_{JPEG2000}} \times 100 \quad (3)$$

$Bitrate_{JPEG2000}$ is the compressed file size using JPEG2000 lossless while $Bitrate_{Proposed}$ is the compressed file size using the MD-Template method based on H.264-LS. Overall, the MD-Template based method saves 8.6% bits compared with JPEG2000 lossless on average.

TABLE 6

Compression comparison between JPEG2000 lossless and MD-Template method based on H.264-LS

| Class | Resolution | Image Fold | Number of Images | Bit Saving (%)* |
|---|---|---|---|---|
| A | 256 × 256 | T2W-FE-EPI - 501 | 22 | 11.6 |
| | | T1-3D-FFE-C - 801 | 100 | 13.8 |
| | 288 × 288 | sT2W-FLAIR - 401 | 22 | 9.0 |
| | 512 × 512 | sT2-TSE-T - 301 | 22 | 1.1 |
| | | T1-SE-extrp - 601 | 22 | 1.5 |
| | | T1-SE-extrp - 701 | 22 | 1.8 |
| | | SOUS - 702 | 22 | 5.3 |
| B | 1024 × 1024 | IDEFIX | 26 | 8.2 |
| C | 1720 × 2320 | LOMBAIRE FACE | 6 | 4.6 |
| | 2320 × 2828 | PA - 3 | | |
| | 2320 × 2920 | | | |
| Averaged bit saving over 261 images | | | | 8.6 |

*Bit Saving is defined in equation (3)

The MD-Template based method provides an improved coding performance compared to JPEG 2000 for lossless/near lossless image coding. Moreover, the MD-Template method is based on the H.264 framework such that it may be incorporated into the DICOM standard.

It will be appreciated by the person of skill in the art that various modifications may be made to the above-described embodiments without departing from the scope of the present invention. In the meanwhile, the present invention may be applied to other image/video compression standards that have adopted the mode dependent transformation, for example the H.265 standard. Whilst the above-described embodiments refer to specific encoding formats such as the H.264/AVC and JPEG lossless formats, it will be appreciated by a person skilled in that art that the present invention is applicable to any image/video encoding/decoding lossless format or standard such as MPEG, JPEG-2000, H.264/AVC, High Efficiency Video Coding (HEVC)/H.265 and beyond.

Although the invention has been described in terms of example solutions or preferred embodiments as set forth above, it should be understood that these examples or embodiments are illustrative only and that the claims are not limited to only those examples or embodiments. Those skilled in the art will be able to make modifications and alternatives in view of the disclosure which are contemplated as falling within the scope of the appended claims. Each of the features, steps, or nodes disclosed or illustrated in the present specification may be incorporated into the invention, whether alone or in any appropriate combination with any other feature, step, or node disclosed or illustrated herein.

The invention claimed is:

1. A method of encoding an intra predicted residual block of an image for use in image or video compression, wherein the intra predicted residual block is associated with an intra prediction coding mode, the method comprising:
   generating a plurality of residual error blocks from the intra predicted residual block, wherein the residual error blocks include residual data with different statistical characteristics from the residual data in the intra predicted residual block;
   scanning and entropy coding each of the residual error blocks to produce a first plurality of bit streams and recording the lengths of each of the first plurality of bit streams;
   scanning and entropy coding the intra predicted residual block to produce a second bit stream and recording the length of the second bit stream;
   selecting the minimum length bit stream from the first plurality of bit streams and the second bit stream as the output coded bit stream of the intra predicted residual block.

2. A method according to claim 1, wherein the step of generating the plurality of residual error blocks comprises subtracting the intra predicted residual block from a weighted plurality of predefined template blocks associated with the intra prediction coding mode, wherein each predefined template block is a binary matrix associated with a specific scanning order.

3. A method according to claim 1, wherein each of the first plurality of bit streams includes header data representative of information associated with the corresponding residual error block.

4. A method according to claim 1, wherein the steps of generating the plurality of residual error blocks, scanning and entropy coding each of the residual error blocks and recording the lengths of the first plurality of bits streams comprise:
   generating the first plurality of bit streams for each scale factor, $a_j$, from a plurality of scale factors and for each template block, $W_k$, from a plurality of predefined template blocks associated with the intra prediction coding mode by:
   calculating a residual error block $R_i$, by subtracting the intra predicted residual block, $X_i$, from a weighted predefined template block, $a_j W_k$;
   scanning $R_i$ with the corresponding scanning order associated with $W_k$;
   entropy coding the scanned $R_i$ outputting a coded bit stream for including in the first set of bit streams; and
   recording the length of the output coded bitstream, $l(a_j, W_k)$.

5. A method according to claim 4, wherein, each of the first bit streams includes the corresponding output coded bitstream and header data representative of the scale factor associated with the corresponding first coded bit stream.

6. A method according to any of claim 5, wherein, each of the first bit streams further includes header data representative of the predefined template block associated with the corresponding first coded bit stream.

7. A method according to claim 1, wherein the step of scanning and entropy coding the intra predicted residual block, $X_i$, further comprises:
   scanning, $X_i$, with a zigzag scanning order;
   entropy coding the scanned $X_i$ to output the second coded bit stream; and
   recording the length of the second coded bit stream.

8. A method according to claim 1, further comprising the step of selecting from the first plurality of bit streams a first coded bit stream having the minimum recorded length.

9. A method according to claim 8, further comprising:
   comparing the recorded length of the first coded bit stream with the recorded length of the second coded bit stream;
   selecting the first coded bit stream as the output bit stream when the minimum recorded length is less than the recorded length of the second coded bit stream.

10. A method according to claim 2, further comprising a step of generating a said predefined template block by:
    determining a first template block associated with the intra prediction coding mode by minimizing:

$$W_{opt} = \underset{W}{\operatorname{argmin}} \sum_i \|vec(X_i - a_i W)\|_0$$

$$\text{s.t } W(r, c) \in \{0, 1\},$$

where $X_i$ is a given n×n intra predicted residual block associated with the intra prediction coding mode, W is an n×n the template block from the set of template blocks in which each entry is either a zero or one, $a_i$ is a scale integer having a predefined range, vec() is a vectorization operator that turns all the matrix elements to a vector form in the row by row order, and $\|.\|_0$ is the L0-Norm for calculating the total number of non-zero elements of a vector, where binary matrix $W_{opt}$ is the first template block, in which for a given group of one or more intra predicted residual blocks $X_1 \ldots X_i \ldots X_n$ associated with the intra prediction mode, the number of non-zero coefficients is minimized.

11. A method according to claim 10, further comprising generating a second said predefined template block by performing the step of determining a second time, wherein the first template block is excluded from the set of template blocks during the minimization such that the binary matrix $W_{opt}$, is the second template block, in which for a given group of one or more intra predicted residual blocks $X_1 \ldots X_i \ldots X_n$ associated with the intra prediction mode, the number of non-zero coefficients is minimized.

12. A method according to claim 2, wherein, when the intra prediction mode is 0 and the residual intra prediction block is a 4×4 block, then the plurality of predefined template blocks includes at least one block selected from the group of:

[Matrix templates shown]

13. A method according to claim 12, wherein the scanning order for the group of template blocks is a row by row, top to bottom, left to right order, in which '0' positions are scanned first and '1' positions are scanned last.

14. A method according to claim 2, wherein, when the intra prediction mode is 1 and the residual intra prediction block is a 4×4 block, then the plurality of predefined template blocks includes at least one block selected from the group of

[Matrix templates shown]

15. A method according to claim 14, wherein the scanning order for the group of template blocks is a column by column, left to right, top to bottom order, in which '0' positions are scanned first and '1' positions are scanned last.

16. A method according to claim 2, wherein, when the intra prediction mode is 3 and the residual intra prediction block is a 4×4 block, then the plurality of predefined template blocks includes at least one block selected from the group of

[Matrix templates shown]

17. A method according to claim 16, wherein the scanning order for the group of template blocks is the scanning order is the reflection of zigzag order with '1' positions reordered, in which '0' positions are scanned first and '1' positions are scanned last.

18. A method according to claim 2, wherein, when the intra prediction mode is 4 and the residual intra prediction block is a 4×4 block, then the plurality of predefined template blocks includes at least one block selected from the group of

[Matrix templates shown]

-continued $$\begin{bmatrix}0&0&0&0\\0&0&0&1\\0&0&1&0\\0&0&0&0\end{bmatrix};\begin{bmatrix}0&0&0&0\\0&0&0&0\\0&0&1&0\\0&1&0&0\end{bmatrix};\begin{bmatrix}0&1&0&0\\1&0&0&0\\0&0&0&0\\0&0&0&0\end{bmatrix};\text{ and }\begin{bmatrix}0&0&0&0\\0&0&0&0\\0&0&0&1\\0&0&1&0\end{bmatrix}.$$

19. A method according to claim 18, wherein the scanning order for the group of template blocks is zigzag order in which '0' positions are scanned first and '1' positions are scanned last.

20. A method according to claim 2, wherein, when the intra prediction mode is 2 and the residual intra prediction block is a 4×4 block, then the plurality of predefined template blocks includes at least one block selected from the group of $$\begin{bmatrix}1&1&0&0\\0&0&0&0\\0&0&0&0\\0&0&0&0\end{bmatrix};\begin{bmatrix}0&0&0&0\\0&0&1&1\\0&0&0&0\\0&0&0&0\end{bmatrix};\begin{bmatrix}0&0&0&0\\0&0&1&0\\0&0&1&0\\0&0&0&0\end{bmatrix};\begin{bmatrix}1&0&0&0\\1&0&0&0\\0&0&0&0\\0&0&0&0\end{bmatrix};$$

$$\begin{bmatrix}0&0&0&0\\1&0&0&0\\1&0&0&0\\0&0&0&0\end{bmatrix};\begin{bmatrix}0&0&0&0\\0&1&0&0\\0&1&0&0\\0&0&0&0\end{bmatrix};\begin{bmatrix}0&0&0&0\\0&1&0&0\\0&0&1&0\\0&0&0&0\end{bmatrix};\begin{bmatrix}0&0&0&0\\1&0&0&0\\0&1&0&0\\0&0&0&0\end{bmatrix};$$

$$\begin{bmatrix}0&0&0&0\\0&1&0&0\\0&0&0&0\\0&0&0&1\end{bmatrix};\begin{bmatrix}0&0&0&0\\1&0&0&0\\0&0&1&0\\0&0&0&0\end{bmatrix};\begin{bmatrix}0&1&0&0\\0&0&0&0\\0&0&1&0\\0&0&0&0\end{bmatrix};\begin{bmatrix}0&1&0&0\\1&0&0&0\\0&0&0&0\\0&0&0&0\end{bmatrix};$$

$$\begin{bmatrix}0&0&0&0\\0&0&1&0\\0&1&0&0\\0&0&0&0\end{bmatrix};\begin{bmatrix}0&0&0&0\\0&0&0&0\\0&0&1&0\\0&1&0&0\end{bmatrix};\begin{bmatrix}0&0&1&0\\0&0&0&0\\1&0&0&0\\0&0&0&0\end{bmatrix};\text{ and }\begin{bmatrix}0&0&0&0\\0&0&0&1\\0&0&1&0\\0&0&0&0\end{bmatrix}.$$

21. A method according to claim 20, wherein the scanning order for the group of template blocks:

(a) to (b) is a row by row, top to bottom, left to right order;

(c) to (f) is a column by column, left to right, top to bottom order;

(g) to (k) is the reflection of zigzag order; and (l) to (p) is the zigzag order;

in which '0' positions are scanned first and '1' positions are scanned last.

22. An apparatus for encoding an intra predicted residual block of an image for use in image or video compression, wherein the intra predicted residual block is associated with an intra prediction coding mode, the apparatus comprising:

a generation unit configured for generating a plurality of residual error blocks from the intra predicted residual block, wherein the residual error blocks include residual data with different statistical characteristics from the residual data in the intra predicted residual block;

a scanning unit configured for:

scanning each of the residual error blocks to produce a plurality of scanned residual blocks; and scanning the intra predicted residual block to produce a scanned intra predicted residual block;

an entropy coding unit configured for:

entropy coding each of the scanned residual error blocks to produce a first plurality of bit streams;

entropy coding the scanned intra predicted residual block to produce a second bit stream;

a memory unit configured for recording the lengths of each of the first plurality of bit streams and the length of the second bit stream;

a selection unit configured for selecting the minimum length bit stream from the first plurality of bit streams and the second bit stream as the output coded bit stream of the intra predicted residual block.

\* \* \* \* \*